(12) United States Patent
Yamanaka et al.

(10) Patent No.: US 6,869,678 B2
(45) Date of Patent: Mar. 22, 2005

(54) REMOVABLE PRESSURE-SENSITIVE ADHESIVE AND ADHESIVE SHEET OF THE SAME

(75) Inventors: Takeshi Yamanaka, Ibaraki (JP); Shinetsu Itou, Ibaraki (JP); Kenichi Shibata, Ibaraki (JP); Takeshi Suto, Ibaraki (JP); Isamu Miyoshi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/314,949

(22) Filed: Dec. 10, 2002

(65) Prior Publication Data

US 2003/0124346 A1 Jul. 3, 2003

(30) Foreign Application Priority Data

Dec. 19, 2001 (JP) ..................... P2001-386164

(51) Int. Cl.[7] .............................................. B32B 27/30
(52) U.S. Cl. ................. 428/355 AC; 524/457; 524/458; 524/461; 524/86; 524/91; 524/99; 526/89; 526/173; 526/201; 526/217
(58) Field of Search .................. 428/355 AC, 355 EN; 524/457, 45, 461, 86, 91, 99; 526/89, 173, 201, 217, 286, 287, 313, 320

(56) References Cited

U.S. PATENT DOCUMENTS 6,686,413 B2 * 2/2004 Nakamura et al. .......... 524/553

FOREIGN PATENT DOCUMENTS

| EP | 0 600 428 A1 | 6/1994 |
| JP | 08-295861 | 11/1996 |
| JP | 2002-003808 | 1/2000 |
| WO | WO 99/31153 A | 6/1999 |

OTHER PUBLICATIONS

Machine Translation, JP 2002–003808, Yamanaka et al., Jan. 9, 2002.*

* cited by examiner

Primary Examiner—David J. Buttner
Assistant Examiner—Christopher Keehan
(74) Attorney, Agent, or Firm—Sughrue Mion, PLLC

(57) ABSTRACT

A removable pressure-sensitive adhesive which, even when applied to metal sheets or to metallic members which have undergone a coating treatment, is inhibited from increasing in adhesive force with the lapse of time and can be easily removed therefrom and which has satisfactory weatherability and satisfactory pot life contains 100 parts by weight on a solid basis of an aqueous dispersion type acrylic copolymer obtained by polymerizing a monomer mixture in an aqueous medium in the presence of a nonionic surfactant and/or an anionic surfactant each having an ethylenic double bond and 0.1 to 3 parts by weight of a hindered-amine light stabilizer having a piperidine ring in which the nitrogen atom has a tertiary amine structure; and an adhesive sheet is produced with the adhesive.

3 Claims, No Drawings

REMOVABLE PRESSURE-SENSITIVE ADHESIVE AND ADHESIVE SHEET OF THE SAME

FIELD OF THE INVENTION

The present invention relates to a removable pressure-sensitive adhesive based on an aqueous dispersion type acrylic copolymer and a pressure-sensitive adhesive sheet obtained from the same. Removable pressure-sensitive adhesives are extensively used in applications such as surface-protective films, masking tapes for painting, and pressure-sensitive adhesive memorandum pads.

BACKGROUND OF THE INVENTION

Surface-protective films for metallic products or plastic products have hitherto been used in such a manner that the films are applied to surfaces of these products for the purpose of protecting the products against marring, soiling, or corrosion during transportation, storage, or processing and peeled therefrom after the temporary protection. The surface-protective films are hence required to be adhered to the metallic products or plastic products during the transportation, storage, or processing thereof and to be capable of being easily peeled from the adherends when the products are ready for use.

However, the pressure-sensitive adhesive sheets for use as such surface-protective sheets generally undergo an increase in adhesive force after application because the wetting of the pressure-sensitive adhesive proceeds with the lapse of time. The surface-protective films hence become difficult to peel from the adherends, and there are cases where the peeling operation requires much time or leaves a residue of the pressure-sensitive adhesive on the adherends. Especially in application to adherends which have undergone a surface treatment, such as painted steel sheets, the wetting of the pressure-sensitive adhesive is apt to proceed due to the surface roughness of the adherends and the adhesive force is hence apt to increase. Furthermore, when such members covered with surface-protective films are placed outdoors during execution of works and the protective films are peeled therefrom after the execution, there are often cases where the base material or adhesive deteriorates to leave an adhesive residue and this impairs the appearance of the products.

A technique generally employed for preventing such a phenomenon is to impart weatherability to the base material or adhesive layer. However, especially when a weathering agent is incorporated into an adhesive, the viscosity of the adhesive often increases considerably depending on the constitution of the adhesive components or on the kind of the weathering agent, making the application thereof impossible. Namely, there are cases where productivity is impaired due to limitations on pot life.

On the other hand, external crosslinking agents are often incorporated into adhesives for the purposes of improving cohesive force, securing anchoring to base materials, etc. As the crosslinking agents are generally used water-soluble melamines, emulsion type isocyanates, aziridine compounds, epoxy compounds, or the like. However, the incorporation of such a crosslinking agent sometimes poses problems in production steps due to the necessity of installation of a two-liquid mixer and limitations on adhesive pot life. Furthermore, when such an adhesive is applied to a polyethylene base material and dried, there are cases where the heat resistance of the polyethylene base material imposes limitations on the drying temperature to pose a problem that the crosslinking reaction is incomplete.

SUMMARY OF THE INVENTION

The invention has been achieved in view of the drawbacks described above. An aim of the invention is to provide a removable pressure-sensitive adhesive which, even when applied to metal sheets or to metallic members which have undergone a coating treatment, is inhibited from increasing in adhesive force with the lapse of time and can be easily removed therefrom and which has satisfactory weatherability and satisfactory pot life. Another aim of the invention is to provide an adhesive sheet produced with the adhesive.

The present inventors made intensive investigations in order to overcome the problems described above. As a result, it has been found that those aims can be accomplished with the removable pressure-sensitive adhesive described below and an adhesive sheet thereof. The invention has been completed based on this finding.

The invention provides a removable pressure-sensitive adhesive which comprises:

100 parts by weight on a solid basis of an aqueous dispersion type acrylic copolymer obtained by polymerizing in an aqueous medium a monomer mixture comprising
(A) from 50 to 99.9% by weight at least one acrylate monomer represented by general formula (1):

wherein $R^1$ represents a hydrogen atom or a methyl group and $R^2$ represents an alkyl group having 2 to 14 carbon atoms,
(B) from 0.1 to 5% by weight at least one carboxyl group-containing monomer, and
(C) from 0 to 49.9% by weight one or more monomers copolymerizable with ingredients (A) and (B), in the presence of
(D) at least one nonionic surfactant and/or at least one anionic surfactant each having an ethylenic double bond copolymerizable with the monomer mixture, the amount of ingredient (D) being from 0.1 to 6 parts by weight per 100 parts by weight of the monomer mixture; and
from 0.1 to 3 parts by weight of a hindered-amine light stabilizer having a piperidine ring wherein the nitrogen atom has a tertiary amine structure.

The removable pressure-sensitive adhesive of the invention has a high degree of weatherability since it comprises an aqueous dispersion type acrylic copolymer having a specific structure and a hindered-amine light stabilizer incorporated therein. Because of this, even when the adhesive is used under such severe conditions that the adherend to which the adhesive has been applied is allowed to stand outdoors for long, the adhesive suffers little increase in adhesive force with the lapse of time, can be easily removed, and is less apt to cause the adherend to be soiled by an adhesive residue or the like. Furthermore, for producing the aqueous dispersion type acrylic copolymer, a carboxyl group-containing monomer was used in order to impart particle stability in water and mechanical stability during application and to make the copolymer have crosslinkable sites. It is thought that when this acrylic copolymer is used in combination with a hindered-amine light stabilizer which is highly basic as a weathering agent, then the carboxyl groups interact with the weathering agent and, as a result, the viscosity of the adhesive increases abruptly. In the removable pressure-sensitive adhesive of the invention, the hindered-amine light stabilizer contained therein is one which has a piperidine ring wherein the nitrogen atom has a tertiary amine structure. Since this amine compound shows reduced interaction with carboxyl groups, the adhesive of the invention can be inhibited from increasing in viscosity and has a long pot life.

The removable pressure-sensitive adhesive preferably contains a benzotriazole compound ultraviolet absorber in an amount of from 0.1 to 3 parts by weight per 100 parts by weight of the aqueous dispersion type acrylic copolymer on a solid basis. By using the hindered-amine light stabilizer in combination with a benzotriazole compound ultraviolet absorber, the effect of improving weatherability can be enhanced further.

The removable pressure-sensitive adhesive preferably contains a water-soluble crosslinking agent having an oxazoline group, in such an amount that the amount of the oxazoline groups is from 0.1 to 5 equivalents to the carboxyl groups of the aqueous dispersion type acrylic copolymer. Even when the water-soluble crosslinking agent having an oxazoline group is incorporated into the aqueous dispersion type acrylic copolymer, it has low reactivity with the aqueous dispersion type acrylic copolymer at ordinary temperature and, hence, does not impair the pot life of the removable pressure-sensitive adhesive.

The invention further provides a pressure-sensitive adhesive sheet which comprises a base material and, disposed on one or each side thereof, a layer formed from the removable pressure-sensitive adhesive described above.

DETAILED DESCRIPTION OF THE INVENTION

Ingredient (A) in the invention is at least one acrylate monomer represented by general formula (1): $CH_2=CR^1COOR^2$ wherein $R^1$ represents a hydrogen atom or a methyl group and $R^2$ represents an alkyl group having 2 to 14 carbon atoms. Namely, ingredient (A) is at least one acrylic ester and/or at least one methacrylic ester. Examples of $R^2$ in general formula (1) include ethyl, propyl, butyl, isobutyl, isoamyl, hexyl, heptyl, 2-ethylhexyl, isooctyl, isononyl, and isodecyl groups.

The acrylate monomer as ingredient (A) is used in an amount of from 50 to 99.9% by weight, preferably from 67 to 99% by weight, based on the monomer mixture. In case where the amount thereof is smaller than 50% by weight, initial adhesiveness is impaired. In case where the amount thereof exceeds 99.9% by weight, the proportion of the carboxyl group-containing monomer as ingredient (B) is too small, resulting in reduced adhesion to base materials.

The carboxyl group-containing monomer as ingredient (B) serves to improve adhesion to base materials and enhance initial adhesiveness to adherends. Examples thereof include acrylic acid, methacrylic acid, itaconic acid, maleic acid, and crotonic acid. The carboxyl group-containing monomer is used in an amount of from 0.1 to 5% by weight, preferably from 0.5 to 3% by weight, based on the monomer mixture. In case where the amount thereof is smaller than 0.1% by weight, adhesion to base materials is impaired. On the other hand, amounts thereof exceeding 5% by weight are undesirable in that such large ingredient (B) amounts lead to an increase in adhesive force with time.

Ingredient (C), which is one or more monomers copolymerizable with ingredients (A) and (B), is used according to need for the purposes of regulating initial adhesive force or stability of adhesive force over a prolonged time period, regulating cohesive force, etc. Examples thereof include cyclohexyl (meth)acrylate, benzyl (meth)acrylate, isobornyl (meth)acrylate, t-butylcyclohexyl (meth)acrylate, vinyl acetate, styrene, glycidyl (meth)acrylate, 2-hydroxyethyl (meth)acrylate, 2-hydropropyl (meth)acrylate, methyl (meth)acrylate, N-(meth)acryloylmorpholine, N-(meth)acryloylpyrrolidone, N,N-dimethyl(meth)acrylamide, and N-vinyl-2-pyrrolidone. Ingredient (C) is used in an amount of from 0 to 49.9% by weight, preferably from 0 to 30% by weight, based on the monomer mixture. Amounts thereof exceeding 49.9% by weight are undesirable in that such large ingredient (C) amounts lead to a decrease in initial adhesive force.

An internal crosslinking agent can be added to the monomer mixture comprising ingredients (A) to (C) in order to further improve the cohesive force of the pressure-sensitive adhesive to be obtained. Examples of the internal crosslinking agent include polyfunctional acrylic monomers such as methylenebisacrylamide, 1,6-hexanediol di(meth)acrylate, and trimethylolpropane tri(meth)acrylate. In general, such an internal crosslinking agent is used in an amount of preferably up to 2 parts by weight per 100 parts by weight of the monomer mixture comprising ingredients (A) to (C). When the internal crosslinking agent is used in an amount exceeding 2 parts by weight, there are cases where the copolymer particles have impaired fusion-bonding properties and the adhesive has poor film-forming properties and poses problems concerning cissing and anchoring on base materials.

The monomer mixture described above is polymerized in an aqueous medium in the presence of ingredient (D), which is at least one nonionic surfactant and/or at least one anionic surfactant each having an ethylenic double bond to thereby obtain an aqueous dispersion type acrylic copolymer. Aqueous dispersion type acrylic copolymers are more effective in mitigating the problem of adherend soiling than solvent-based ones. Ingredient (D) not only functions as an emulsifying agent during the polymerization of the monomer mixture, but also is incorporated into the copolymer and serves to improve adhesive properties, inhibit the adhesive force from increasing with time, and facilitate adhesive removal after application.

As ingredient (D) can be used, without particular limitations, one or more nonionic and/or anionic surfactants having an ethylenic double bond, as long as they are copolymerizable with the monomer mixture. Examples of the nonionic surfactant include:

compounds represented by the formula (1a):

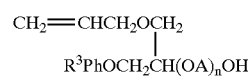

wherein $R^3$ represents an alkyl group having 6 to 14 carbon atoms; Ph represents a phenylene group; A represents an alkylene or substituted alkylene group having 2 to 4 carbon atoms; and n is an integer of 5 to 100;

compounds represented by the formula (2):

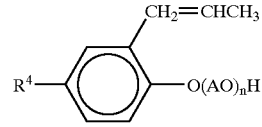

wherein $R^4$ represents an alkyl group having 6 to 14 carbon atoms; A represents an alkylene or substituted alkylene group having 2 to 4 carbon atoms; and n is an integer of 5 to 100;

compounds represented by the formula (2a):

wherein $R^5$ represents a hydrogen atom or an alkyl group having 1 to 14 carbon atoms; A represents an alkylene or substituted alkylene group having 2 to 4 carbon atoms; and n is an integer of 5 to 100; and compounds represented by the formula (2b):

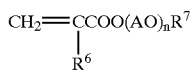

wherein $R^6$ represents a hydrogen atom or a methyl group; $R^7$ represents a hydrogen atom or an alkyl group having 1 to 14 carbon atoms; A represents an alkylene or substituted alkylene group having 2 to 4 carbon atoms; and n is an integer of 5 to 100.

Examples of the anionic surfactant include:
compounds represented by the formula (2c):

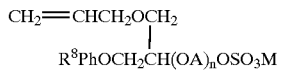

wherein $R^8$ represents an alkyl group having 6 to 14 carbon atoms; Ph represents a phenylene group; A represents an alkylene or substituted alkylene group having 2 to 4 carbon atoms; n is an integer of 5 to 100; and M represents an alkali metal atom, $NH_4$, or an alkanolamine residue;
compounds represented by the formula (3):

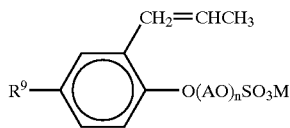

wherein $R^9$ represents an alkyl group having 6 to 14 carbon atoms; A represents an alkylene or substituted alkylene group having 2 to 4 carbon atoms; n is an integer of 5 to 100; and M represents an alkali metal atom, $NH_4$, or an alkanolamine residue;
compounds represented by the formula (3a):

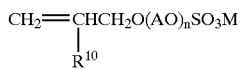

wherein $R^{10}$ represents a hydrogen atom or a methyl group; A represents an alkylene or substituted alkylene group having 2 to 4 carbon atoms; n is an integer of 5 to 100; and M represents an alkali metal atom, $NH_4$, or an alkanolamine residue;
compounds represented by the formula (3b):

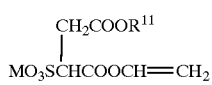

wherein $R^{11}$ represents an alkyl group having 6 to 16 carbon atoms; A represents an alkylene or substituted alkylene group having 2 to 4 carbon atoms; n is an integer of 5 to 100; and M represents an alkali metal atom, $NH_4$, or an alkanolamine residue; and
compounds represented by the formula (3c):

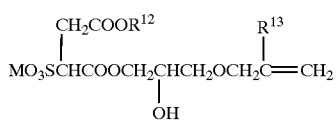

wherein $R^{12}$ represents an alkyl group having 1 to 16 carbon atoms; $R^{13}$ represents a hydrogen atom or a methyl group; and M represents an alkali metal atom, $NH_4$, or an alkanolamine residue.

Although ingredient (D) may be one member or a combination of two or more members selected from such nonionic surfactants and anionic surfactants, it is preferred to use a combination of at least one nonionic surfactant and at least one anionic surfactant. Ingredient (D) is used in an amount of from 0.1 to 6 parts by weight, preferably from 0.12 to 5.8 parts by weight, more preferably from 0.15 to 5.5 parts by weight, per 100 parts by weight of the monomer mixture. In case where the amount thereof is smaller than 0.1 part by weight, the effects described above are not fully produced. Furthermore, such too small surfactant amounts result in poor mechanical emulsion stability during or after polymerization and a stable aqueous dispersion type acrylic copolymer is not obtained. In case where the amount thereof exceeds 6 parts by weight, the resultant acrylic copolymer has poor moisture resistance, leading to a decrease in adhesive performance.

Other surfactants can be used in combination with ingredient (D) as long as this does not defeat the aims of the invention. Examples thereof include polyoxyethylene nonylphenyl ether phosphate, polyoxyethylene octylphenyl ether phosphate, polyoxyethylene dinonylphenyl ether phosphate, polyoxyethylene dioctylphenyl ether phosphate, polyoxyethylene alkyl ethers, polyoxyethylene alkylphenyl ethers, oxyethylene/oxypropylene block polymers, sorbitan fatty acid esters, polyoxyethylene/fatty acids, alkylsulfuric acid esters, alkylbenzenesulfonic acid salts, alkylsulfosuccinic acid salts, alkyldiphenyl ether disulfonic acid salts, polyoxyethylene alkylsulfuric acid salts, and polyoxyethylene alkylphosphoric acid esters.

In polymerizing the monomer mixture comprising ingredients (A) to (C) in the presence of ingredient (D), a polymerization initiator is used. As the polymerization initiator is used potassium persulfate, ammonium persulfate, 2,2'-azobis(2-amidinopropane)dihydrochloride, or the like in an ordinary proportion. After the polymerization, the reaction mixture is neutralized with a neutralizing agent, e.g., ammonia, to regulate the pH thereof to a given value. Thus, an aqueous dispersion type acrylic copolymer having satisfactory stability is obtained.

The hindered-amine light stabilizer to be incorporated into the aqueous dispersion type acrylic copolymer described above is one having a piperidine ring in which the nitrogen atom has a tertiary amine structure. Examples of this hindered-amine light stabilizer include:

decanedioic acid bis(2,2,6,6-tetramethyl-1-(octyloxy)-4-piperidinyl)ester, a product of reaction of 1,1-dimethylethyl hydroperoxide with octane (molecular weight, 737), and "TINUVIN 123S" (trade name), which is a mixture of 70% the reaction product and 30% polypropylene;

bis(1,2,2,6,6-pentamethyl-4-piperidinyl)[[3,5-bis(1,1-dimethylethyl)-4-hydroxyphenyl]methyl]butylmalonate (molecular weight, 685) (trade name "TINUVIN 144");

a mixture of bis(1,2,2,6,6-pentamethyl-4-piperidinyl) sebacate and methyl 1,2,2,6,6-pentamethyl-4-piperidinyl) sebacate (molecular weight, 509) (trade name "TINUVIN 765");

N,N',N",N"'-tetrakis(4,6-bis(butyl(N-methyl-2,2,6,6-tetramethylpiperidin-4-yl)amino)triazin-2-yl)-4,7-diazadecane-1,10-diamine (molecular weight, 2,268) and "CHIMASSORB 119LF" (trade name), which is a mixture of 90% the diamine and 10% "TINUVIN 622"; and a product of polymerization of dimethyl succinate with 4-hydroxy-2,2,6,6-tetramethyl-1-piperidineethanol (molecular weight, 3,100–4,000) (trade name "TINUVIN 622LD"). These amine compounds may be used alone or in combination of two or more thereof. The commercial products shown above all are manufactured by Ciba Specialty Chemicals Co.

The hindered-amine light stabilizer is used in an amount of from 0.1 to 3 parts by weight, preferably from 0.12 to 2.8 parts by weight, more preferably from 0.15 to 2.5 parts by weight, per 100 parts by weight of the aqueous dispersion type acrylic copolymer (on a solid basis). In case where the amount thereof is smaller than 0.1 part by weight, the effect of improving weatherability is difficult to obtain. In case where the amount thereof exceeds 3 parts by weight, it is difficult to obtain the effect of reducing adherend soiling by diminishing an adhesive residue because the light stabilizer is apt to migrate to the adherend to soil it.

Examples of the benzotriazole compound ultraviolet absorber include:

2-(2H-benzotriazol-2-yl)-p-cresol (trade name "TINUVIN P", trade name "TINUVIN P FL");

2-(2H-benzotriazol-2-yl)-4,6-bis(1-methyl-1-phenylethyl)phenol (trade name "TINUVIN 234", trade name "TINUVIN 234FF");

2-benzotriazol-2-yl-4,6-tert-butylphenol (trade name "TINUVIN 320");

2-[5-chloro-(2H)-benzotriazol-2-yl]-4-methyl-6-(tert-butyl)phenol (trade name "TINUVIN 326", trade name "TINUVIN 326FL");

2,4-di-tert-butyl-6-(5-chlorobenzotriazol-2-yl)-phenol (trade name "TINUVIN 327", trade name "TINUVIN 327FL");

2-(2H-benzotriazol-2-yl)-4,6-di-tert-pentylphenol (trade name "TINUVIN 328");

2-(2H-benzotriazol-2-yl)-4-(1,1,3,3-tetramethyl-butyl) phenol (trade name "TINUVIN 329", trade name "TINUVIN 329FL");

a product of reaction of methyl 3-(3-(2H-benzotriazol-2-yl)-5-tert-butyl-4-hydroxyphenyl)propionate with polyethylene glycol 300 (trade name "TINUVIN 213"); and 2-(2H-benzotriazol-2-yl)-6-(linear and branched dodecyl)-4-methylphenol (trade name "TINUVIN 571). These benzotriazole compounds may be used alone or in combination of two or more thereof. The commercial products shown above all are manufactured by Ciba Specialty Chemicals Co.

The benzotriazole compound ultraviolet absorber may be used in an amount of generally from 0.1 to 3 parts by weight, preferably from 0.12 to 2.8 parts by weight, more preferably from 0.15 to 2.5 parts by weight, per 100 parts by weight of the aqueous dispersion type acrylic copolymer (on a solid basis). In case where the amount thereof is smaller than 0.1 part by weight, the desired effect cannot be fully produced. In case where the amount thereof exceeds 3 parts by weight, it is difficult to obtain the effect of reducing adherend soiling by diminishing an adhesive residue because the ultraviolet absorber is apt to migrate to the adherend to soil it.

As the water-soluble crosslinking agent having an oxazoline group can be used, without any particular limitation, one having an oxazoline group in the molecule. Although the oxazoline group may be any of 2-oxazoline, 3-oxazoline, and 4-oxazoline groups, it is preferably a 2-oxazoline group. This oxazoline crosslinking agent preferably is a polymer obtained by copolymerizing an addition-polymerizable oxazoline with an unsaturated monomer, such as, e.g., the oxazoline polymer shown in Japanese Patent Publication No. 68499/1995, in particular, the polymer obtained using 2-isopropenyl-2-oxazoline as the addition-polymerizable oxazoline. Examples thereof include trade name "Epocros WS-500", manufactured by Nippon Shokubai Kagaku Kogyo Co., Ltd., which has an oxazoline group equivalent of 220 g•solid/eq.

The reaction between an oxazoline group and a carboxyl group is as shown below.

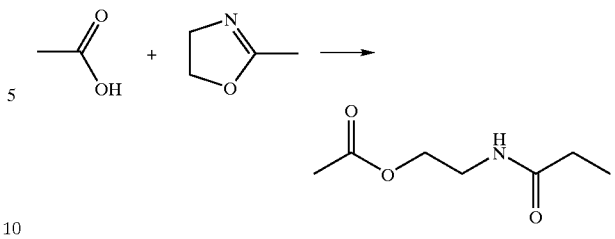

This reaction proceeds rapidly at 80° C. or higher. In contrast, an oxazoline group hardly reacts with carboxylic acid salts, so that the adhesive in which the carboxyl groups have been neutralized has a satisfactory pot life. In the adhesive, the carboxyl groups of the aqueous dispersion type acrylic copolymer have been neutralized with a neutralizing agent, e.g., ammonia, and are in the form of a salt. Consequently, even when an oxazoline compound crosslinking agent is incorporated into the adhesive at ordinary temperature, the crosslinking reaction shown above does not proceed and this adhesive has a long pot life at ordinary temperature. On the other hand, when this adhesive is applied to a base material or the like and dried to volatilize the ammonia, then the crosslinking reaction proceeds rapidly. Furthermore, since this crosslinking reaction proceeds at relatively low temperatures, there is no need of taking account of the heat resistance of the base material even when the base material used is one having low heat resistance, e.g., polyethylene.

The oxazoline compound crosslinking agent may be incorporated in such an amount that the amount of the oxazoline groups is generally from 0.1 to 5 equivalents, preferably from 0.15 to 3 equivalents, more preferably from 0.2 to 1 equivalent, to the carboxyl groups of the aqueous dispersion type acrylic copolymer. In case where the amount of the oxazoline groups in the oxazoline compound crosslinking agent is less than 0.1 equivalent, the effect of the addition of the crosslinking agent is insufficient. On the other hand, amounts thereof exceeding 5 equivalents are undesirable in that a large proportion of the crosslinking agent does not participate in the reaction with the aqueous dispersion type acrylic copolymer and remains unreacted, and this residual crosslinking agent is causative of adherend soiling.

Besides the ingredients described above, additives ordinarily used in adhesives can be incorporated according to need into the removable adhesive of the invention in ordinary amounts. Examples of the additives include fillers such as inorganic powders and metal powders, pigments, colorants, and antioxidants.

The removable pressure-sensitive adhesive described above is used in the form of a pressure-sensitive adhesive sheet comprising a base material and an adhesive layer disposed on one or each side of the base material. The adhesive sheet may be in a tape form. Examples of the base material include plastic films such as polyethylene films, polypropylene films, and polyester films, metal foils, and porous base materials such as papers and nonwoven fabrics. The thickness of the base material is generally about from 10 to 300 μm. The thickness of the adhesive layer is generally about from 1 to 100 μm. Methods for forming the adhesive layer on the base material are not particularly limited, and use may be made of a method in which the adhesive is directly applied and dried and a method which comprises applying the adhesive to a release liner, drying the adhesive to form an adhesive layer, and transferring the adhesive layer to the base material.

The invention will be explained below in more detail by reference to Examples. In the following Examples and Comparative Examples, all parts and percents are by weight.

EXAMPLE 1

Into a reactor equipped with a condenser, nitrogen introduction tube, thermometer, and stirrer was introduced a monomer mixture composed of 59 parts of butyl acrylate, 40 parts of butyl methacrylate, and 1 part of acrylic acid. Thereinto were further introduced 0.2 part of ammonium persulfate as a polymerization initiator, 0.4 part of the nonionic surfactant represented by the general formula (2) described above ($R^4$=nonyl group, A=ethylene, n=20) and 0.2 part of the anionic surfactant represented by the general formula (3) as described above ($R^9$=nonyl group, A=ethylene, n=20, M=$NH_4$) as emulsifying agents, and 100 parts of water. The monomer mixture was emulsion-polymerized. Thereafter, the pH of the reaction mixture was regulated to 8 with 10% ammonia water. Thus, a polymer emulsion was obtained.

A hundred parts on a solid basis of this polymer emulsion was mixed with 1 part of "TINUVIN 765", described above, as a hindered-amine light stabilizer, 0.5 part of "TINUVIN 213", described above, as a benzotriazole compound ultraviolet absorber, and 2 parts of "WS-500" (oxazoline equivalent, 220 g•solid/eq), described above, as an oxazoline group-containing water-soluble crosslinking agent. Thus, a removable pressure-sensitive adhesive was prepared. This removable pressure-sensitive adhesive was applied to one side of a 60-μm low-density polyethylene film in a thickness of 10 μm on a dry basis. The coating was dried at 80° C. for 5 minutes to produce an adhesive sheet.

EXAMPLE 2

A hundred parts on a solid basis of the polymer emulsion obtained in Example 1 was mixed with 1.5 parts of "CHIMASSORB 119LF", described above, as a hindered-amine light stabilizer, 0.5 part of "TINUVIN 327", described above, as a benzotriazole compound ultraviolet absorber, and 2 parts of "WS-500" (oxazoline equivalent, 220 g•solid/eq), described above, as an oxazoline group-containing water-soluble crosslinking agent. Thus, a removable pressure-sensitive adhesive was prepared. This removable pressure-sensitive adhesive was applied to one side of a 60-μm low-density polyethylene film in a thickness of 10 μm on a dry basis. The coating was dried at 80° C. for 5 minutes to produce an adhesive sheet.

COMPARATIVE EXAMPLE 1

A removable pressure-sensitive adhesive was prepared and an adhesive sheet was produced in the same manner as in Example 1, except that the hindered-amine light stabilizer and benzotriazole compound ultraviolet absorber were not incorporated at all.

COMPARATIVE EXAMPLE 2

A removable pressure-sensitive adhesive was prepared and an adhesive sheet was produced in the same manner as in Example 1, except that 5 parts of bis(2,2,6,6-tetramethyl-4-piperidinyl)sebacate (trade name "TINUVIN 770" manufactured by Ciba Specialty Chemicals Co.) was incorporated as a hindered-amine light stabilizer.

EVALUATION TESTS

The removable pressure-sensitive adhesives and adhesive sheets obtained in the Examples and Comparative Examples were subjected to the following evaluations. The results obtained are shown in Table 1.

(Pot Life)

A 500-g portion of each removable pressure-sensitive adhesive was weighed out and put in a glass vessel. This vessel was placed in a 60° C. thermostatic chamber for 24 hours, and the viscosity of the adhesive was visually examined to judge the pot life thereof based on the following criteria.

○: No viscosity increase was observed; the adhesive was applicable.

X: The viscosity increased; the adhesive was difficult to apply.

(Initial Adhesive Force)

A test piece having a width of 20 mm and a length of 100 mm was cut out of each adhesive sheet. The test piece was applied to an adherend (SUS 430BA) by pressing the test piece against the adherend by rolling a 2-kg roller forward and backward on the test piece. This test piece was allowed to stand at 23° C. for 20 minutes and then peeled from the adherend at an angle of 180° under the conditions of a pulling rate of 300 mm/min (23° C., 65% RH) to measure the force (N/20 mm) required for the peeling.

(Weatherability)

A test piece having a width of 20 mm and a length of 100 mm was cut out of each adhesive sheet. The test piece was applied to an adherend (SUS 430BA) by pressing the test piece against the adherend by rolling a 2-kg roller forward and backward on the test piece. This test piece was placed in a sunshine carbon arc weatherometer for 500 hours and then peeled from the adherend at an angle of 180° under the conditions of a pulling rate of 300 mm/min (23° C., 65% RH) to measure the force (peel force for removal, N/20 mm) required for the peeling. Furthermore, the base material was evaluated for deterioration based on the following criteria.

○: No deterioration.

X: Deterioration was observed.

After the peeling, the adherend was examined for surface soiling and evaluated based on the following criteria.

○: No adhesive residue.

X: Adhesive residue was observed.

TABLE 1

|  |  | Example 1 | Example 2 | Comparative Example 1 | Comparative Example 2 |
|---|---|---|---|---|---|
| Potlife | | ○ | ○ | ○ | X |
| Initial adhesive force | | 3.2 | 3.5 | 3.0 | 3.2 |
| Weatherability | Peel force for removal | 6.2 | 6.5 | unable to be measured | 7.0 |
| | Base material deterioration | ○ | ○ | X | X |
| | Soiling | ○ | ○ | ○ | X |

The adhesive sheets obtained in the Examples could be easily removed after application and had satisfactory weatherability. Moreover, the adhesives obtained in the Examples had a satisfactory pot life because they contained a hindered-amine light stabilizer having a piperidine ring in which the nitrogen atom had a tertiary amine structure.

While the invention has been described in detail and with reference to specific embodiments thereof, it will be apparent to one skilled in the art that various changes and modifications can be made therein without departing from the spirit and scope thereof.

What is claimed is:

1. A removable pressure-sensitive adhesive which comprises:

100 parts by weight on a solid basis of an aqueous dispersion type acrylic copolymer and a water-soluble crosslinking agent having an oxazoline group, wherein the aqueous dispersion type acrylic copolymer is obtained by polymerizing in an aqueous medium a monomer mixture comprising
(A) from 50 to 99.9% by weight at least one acrylate monomer represented by general formula (1):

wherein $R^1$ represents a hydrogen atom or a methyl group and $R^2$ represents an alkyl group having 2 to 14 carbon atoms,
(B) from 0.1 to 5% by weight at least one carboxyl group-containing monomer, and
(C) from 0 to 49.9% by weight one or more monomers copolymerizable with ingredients (A) and (B), in the presence of
(D) one member or a combination of two or more members selected from the group consisting of at least one nonionic surfactant having an ethylenic double bond copolymerizable with the monomer mixture and at least one anionic surfactant having an ethylenic double bond copolymerizable with the monomer mixture, the amount of ingredient (D) being from 0.1 to 6 parts by weight per 100 parts by weight of the monomer mixture; and
from 0.1 to 3 parts by weight of a hindered-amine light stabilizer having a piperidine ring wherein the nitrogen atom has a tertiary amine structure, and
wherein the amount of the crosslinking agent being such that the amount of the oxazoline groups is from 0.1 to 5 equivalents to the carboxyl groups of the aqueous dispersion type acrylic copolymer.

2. The removable pressure-sensitive adhesive as claimed in claim 1, which contains a benzotriazole compound ultraviolet absorber in an amount of from 0.1 to 3 parts by weight per 100 parts by weight of the aqueous dispersion type acrylic copolymer on a solid basis.

3. A pressure-sensitive adhesive sheet which comprises a base material and, disposed on one or each side of the base material, a layer formed from the removable pressure-sensitive adhesive as claimed in claim 1.

* * * * *